(12) United States Patent
Degioanni et al.

(10) Patent No.: US 11,663,352 B2
(45) Date of Patent: May 30, 2023

(54) USAGE CONTROL OF PERSONAL DATA

(71) Applicant: ACCENTURE GLOBAL SOLUTIONS LIMITED, Dublin (IE)

(72) Inventors: Laura Wendy Hélène Sylvie Angèle Degioanni, Roquefort-les-Pins (FR); Richard Vidal, Antibes (FR); Baya Dhouib, Valbonne (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 346 days.

(21) Appl. No.: 17/144,012

(22) Filed: Jan. 7, 2021

(65) Prior Publication Data
US 2022/0067182 A1 Mar. 3, 2022

(30) Foreign Application Priority Data
Sep. 2, 2020 (EP) .................................. 20305973

(51) Int. Cl.
| | |
|---|---|
| *G06K 9/36* | (2006.01) |
| *G06K 9/62* | (2022.01) |
| *G06F 21/62* | (2013.01) |
| *G06V 40/16* | (2022.01) |
| *G06F 18/22* | (2023.01) |

(52) U.S. Cl.
CPC .......... *G06F 21/6218* (2013.01); *G06F 18/22* (2023.01); *G06V 40/165* (2022.01); *G06V 40/171* (2022.01); *G06V 40/172* (2022.01); *G06V 40/175* (2022.01)

(58) Field of Classification Search
CPC ....... G06V 40/53; G06V 40/16–40/179; G06F 21/6254
See application file for complete search history.

(56) References Cited

U.S. PATENT DOCUMENTS

2023/0027309 A1* 1/2023 Kuta ..................... G06V 40/16

* cited by examiner

*Primary Examiner* — Brian Werner
(74) *Attorney, Agent, or Firm* — Mannava & Kang, P.C.

(57) ABSTRACT

Examples of a system for usage control of a personal data are described. The system may obtain an input image including a first face of a person. Further, the system may compute a usage control matrix based on the input image, at least one usage control function, and a predefined criteria. The pre-defined criteria may be associated with at least one of: a data usage policy, a face matching probability related to matching of the face present in the input image, and a face recognition probability related to a recognition of an identity of the person. Furthermore, by using the input image and the usage control matrix, the system may transform the input image to a usage-controlled image. Furthermore, the system may verify a matching of the face present in the input image with a second face present in the usage-controlled image. Furthermore, the system may recognize an identity of the person in the input image and provide a feedback indicative of a failure to verify the identity of the person from the usage-controlled image.

20 Claims, 9 Drawing Sheets

USAGE CONTROL OF PERSONAL DATA

PRIORITY

The present application claims priority under 35 U.S.C. 119(a)-(d) to European patent application number 20305973.8, having a filing date of Sep. 2, 2020, the disclosure of which is hereby incorporated by reference in its entirety.

BACKGROUND

Utilization of the Internet and World Wide Web is increasing exponentially every day. Millions of users browse over the Internet, read or consume web content by using electronic devices such as, for example, personal computers, laptop computers, smartphones, tablets, and the like. Usually, the use of web services, mobile applications, social networking platforms, e-commerce sites, and/or the like, to some extent, involves sharing of private data by the users. This also includes sharing personal data of a user, such as, for example, photos, family details, biometric information, and the like, to a third party.

Generally, while sharing personal data with a third party (e.g. social networking platform, gaming application etc.) users are asked ex ante to review a data usage policy associated with usage of the shared data by the third party. Accordingly, the users may or may not provide their consent for usage of the personal data for specific purposes. Any misuse or usage of the personal data which is not in compliance with the data usage policy (or for an unintended purpose) by the third party is considered illegal. To this end, there also exist many data privacy laws, rules, and regulations such as, for example, 'General Data Protection Regulation' (GDPR), that empower users by legally regulating inappropriate use of the personal data by the third parties. Despite several legal regulations in existence, there may occur many lapses in usage of the personal data by the third party. As an example, in one instance, it was observed that some photos of a person which were uploaded on a social media platform under 'Creative common license' data usage policy, were misused for an unintended purpose (e.g. to train facial recognition algorithm to recognize suspected criminals, terrorists, and aliens) without bringing it to the knowledge of that person. In another instance, it was observed that facial photos shared by a person on a social networking site were inappropriately used to train facial recognition and perform racial profiling without any prior knowledge or consent of that person. Furthermore, often while providing their consent, users may not thoroughly read the regulations associated with the usage of the data in the data usage policy due to paucity of time.

While there is a need for enforcing stricter compliance with the usage of data in accordance with regulations of the data usage policy, there also exists a requirement for some mechanism to technically prevent such an inappropriate usage of the data. Accordingly, there exists a requirement for a system that can effectively process the personal data so that the personal data can be used only for an intended purpose (i.e. for a purpose for which a consent is provided by the user), thereby maintaining data privacy, ensuring data integrity, and enforcing data compliance.

Some of the existing techniques to prevent inappropriate personal data usage involve use of complex cryptographic computations on the personal data or conversion of the personal data into a format which makes the personal data completely non-recognizable to the user himself. Accordingly, a technical problem with currently available mechanisms for ensuring usage of personal data in accordance with a data usage policy, is that they are unable to effectively process the personal data so that it becomes technically difficult to use the personal data for an unintended purpose, while yet maintaining some original characteristics of the personal data (e.g. keeping the personal data in a recognizable format).

BRIEF DESCRIPTION OF DRAWINGS

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods for controlling usage of personal data. A system may be used to implement a control on usage of the personal data (e.g. a personal photograph or an image), in accordance with a data usage policy and/or a purpose for which a user has provided his or her consent. According to some example embodiments, the system may transform an image into a format (e.g. a usage controlled-format) that may not be used for an unintended purpose. For instance, the transformed image may prohibit recognizing an identity of the user by a third party (e.g. a social networking platform) from the transformed image. Further, the transformation of the input image may be such that face matching characteristics in the transformed image may still be preserved and kept similar to original image. That is, while upon transformation it may be technically infeasible to recognize and associate an identity (e.g. biometric identity) of the user from the transformed image, however, the user and/or a machine may still be able to visibly match a face of the user in the transformed image to be similar to one present in the original image.

According to an example embodiment, a system for controlling the usage of personal data may include a processor, a face recognizer, a face matcher, and an image usage controller. The system may obtain an input image that may include a face of a person. For example, the system may obtain a personal photograph of a user. Further, the image usage controller of the system may identify a usage control function that may be used for transformation of the image to the usage-controlled format. There may be several usage control functions that may be used to modify one or more visual characteristics of the input image. In an example, the usage control function may also include an attack function (e.g. exploratory attack function, causative attack function etc.) that may be used to modify the characteristics of the input image. The image usage controller may identify at least one usage control function from amongst several based on one or more characteristics that may be associated with the input image. For instance, in an example, the usage control function may be selected by analyzing several image quality parameters (e.g. brightness, pixel density, exposure etc.) from the input image.

Further, the image usage controller may compute a usage control matrix. The usage control matrix may be computed based on: the at least one usage control function selected by the image usage controller and a predefined criteria. The pre-defined criteria may be associated with several factors. For example, the pre-defined criteria may be associated to a face matching probability related to matching of the face present in the input image. Additionally and/or alternatively, the pre-defined criteria may be associated to a face recognition probability related to a recognition of an identity of the person. In an example, the pre-defined criteria may be associated to a data usage policy indicative of a regulation associated with usage of the input image by a third party in accordance with a purpose consented by the person. Furthermore, upon computing the usage control matrix, the image usage controller may use the usage control matrix to generate an output image i.e. the usage-controlled-image. The image usage controller may transform the input image to the usage-controlled image by the usage control matrix along with the input image.

According to the example embodiment, the face matcher of the system may be capable of verifying if the face present in the input image matches with one present in the usage-controlled image. In other words, the face matcher may verify if faces present in both input image and the usage-controlled image belongs to a same person. Accordingly, the face matcher may generate a feedback that may indicate either a matching or a non-matching of the faces in the input image and the usage-controlled image.

In accordance with the example embodiment, the face recognizer of the system may be capable of identifying facial data associated with any image. The facial data may include at least one of: a facial feature, a facial expression, and a biometric data. For example, the facial feature may include at least one of, a distance between eyes on the face, structure of the face, shape of the lip, length of the eyebrow, size of the nose, shape of the ears, and structure of the jaw line. The face recognizer may use the facial feature, the facial expression, and the biometric data to recognize an identity of an individual present in the image.

According to the example embodiment, the face recognizer may identify a first facial data from the input image and recognize an identity of the person in the input image based on the first facial data. Further, the face recognizer may obtain the usage controlled-image outputted by the image usage controller and may attempt to recognize an identity of the personal using a second facial data that may be derived from the usage controlled-image. As stated earlier, the usage controlled-image may be transformed, by the image usage controller, in such a manner that recognizing an identity of the person using the usage-controlled image may not be technically feasible. Accordingly, upon such an attempt, the face recognizer may provide a feedback indicative of a failure to verify the identity of the person from the usage-controlled image.

By transforming an input image to a usage-controlled image the system ensures that personal data (e.g. biometric data, information related to user identity, etc.) may be used for an intended purpose. Further, while performing such a transformation the system ensures that a data quality (e.g. face matching capability, image quality, etc.) is preserved and not deteriorated drastically. As an example, as described above, the system outputs the transformed image (i.e. the usage-controlled image) that may be visually same as that of original image (i.e. the input image) but one or more characteristics of the image may be anonymized for purposes not consented by the user. Thus, it may be technically infeasible to use the usage-controlled image and recognize an identity of the user from the usage-controlled image. Further details related to usage control of personal data including transformation of the input image, are described in reference to description of various FIGS. 1-9, hereinafter.

Figure 1:
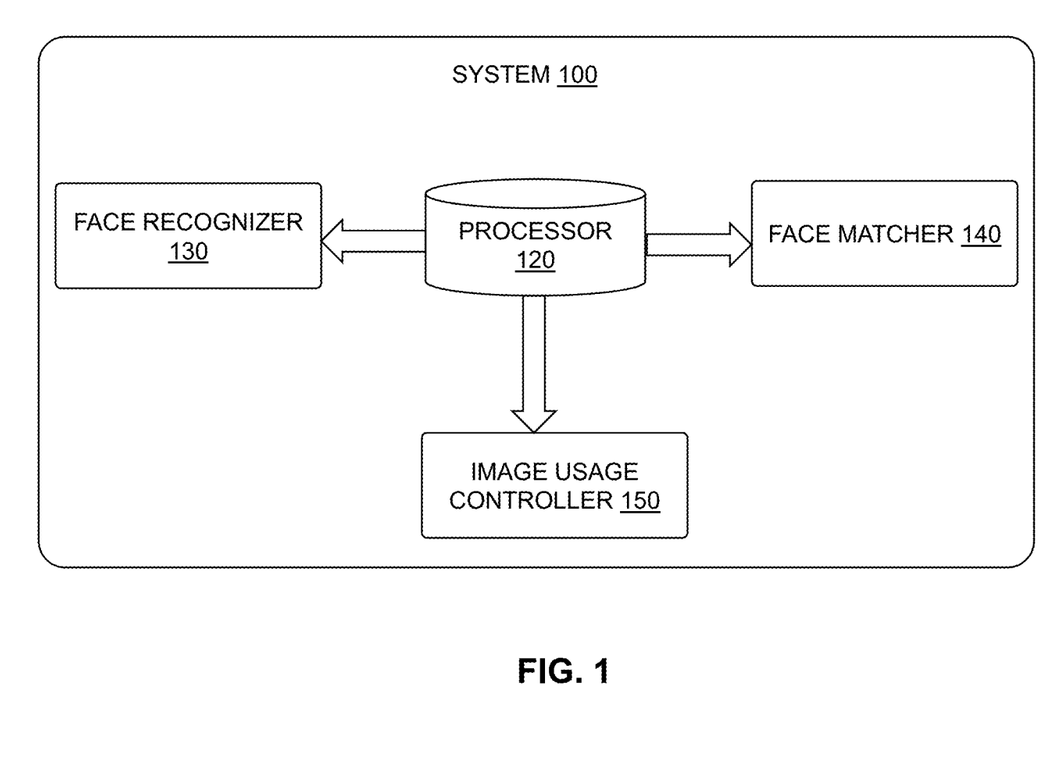
FIG. 1 illustrates a diagram of a system for controlling usage of personal data, according to an example embodiment of the present disclosure.

FIG. 1 illustrates a diagram of a system 100 for controlling usage of personal data (e.g. facial images, photographs etc.), according to an example embodiment of the present disclosure. In an example embodiment, the system 100 may include a processor 120. Further, the system 100 may include various components such as for example, a face recognizer 130, a face matcher 140 and an image usage controller 150. As illustrated, the processor 120 may be coupled (e.g., communicatively coupled), to the face recognizer 130, the face matcher 140 and/or the image usage controller 150. According to various example embodiments described herein, the face recognizer 130, the face matcher 140, and/or the image usage controller 150 may perform various operations based on execution of instructions provided by the processor 120.

In accordance with an example embodiment, the face recognizer 130 may be capable of recognizing a face of an individual from an image. The image may be a personal data file of the individual on which a usage control policy is to be implemented by the system 100. In an example, the image may be captured by an imaging device e.g. a camera of an electronic device (such as, a smartphone) that may be used by the individual. In some examples, the image may correspond to a data file that is to be shared by the individual to a third party and which is to be used by the third party in accordance with a data usage policy for which the individual has consented. As an example, the image may correspond to a photograph that is to be shared by the individual to the third party (e.g. a social networking site).

According to the example embodiment, the face recognizer 130 may be capable of recognizing one or more facial characteristics (such as, facial features, facial expressions, biometric identification data) associated with a face in the image. For instance, the face recognizer 130 may identify specific details about a person's face from the image such as, but not limited to, distance between eyes, shape of nose, structure of face, facial expression etc. Further, the face recognizer 130 may convert this facial information into a mathematical representation that may be used to recognize the facial characteristics. In an example embodiment, to recognize an identity of the individual in the image, the face recognizer 130 may use the mathematical representation and compare it with facial data that may be derived from other facial images stored in a database (i.e. an image bank). In other words, the face recognizer 130 may be capable of processing an input image and recognize an identity of a person in the input image based on recognizing various facial features, facial expressions, and/or biometric data, from the input image. Further, the face recognizer 130 may associate unique facial features identified from the input image with an identity of an individual. Further details of the face recognizer 130 are described in reference to FIG. 2 and FIG. 5

Illustratively, the system 100 may include the face matcher 140. The face matcher 140 may be capable of comparing a candidate picture (e.g. the input image) and a reference picture to identify if same face is present in both the pictures. In other words, the face matcher 140 may be capable of comparing multiple facial images to identify if faces of same person are present in the multiple facial images. As may be understood, while the face matcher 140 may be capable of identifying if two images has matching faces, the face recognizer 130 may recognize more specific details from the input image. As an example, the face recognizer 130 may recognize multiple facial characteristics (e.g. facial features, expressions etc.) that may be unique to an individual. Said differently, in some examples, the face recognizer 130 may identify more specific facial characteristics from the input image compared to the face matcher 140 that may uniquely identify an identity of the individual. Further details of the face matcher 140 are described in reference to FIG. 2 and FIG. 4.

As illustrated, the system 100 may further include the image usage controller 150. The image usage controller 150 may be capable of controlling usage of the input image by a third party. The image usage controller may control the usage of the input image in accordance with the data usage policy and/or conditions for which the user may have provided his or her consent. In this aspect, the image usage controller 150 may process the input image such that a malicious use or usage for a purpose not consented by the user becomes impractical or technically non-feasible.

According to various example embodiments, the image usage controller 150 may transform an input image to a usage-controlled image. The usage-controlled image may represent a new configuration or version of the input image that may enable a controlled usage of the input image by the third party which is in accordance with the data usage policy for which the user has consented. Further, in an example embodiment, the image usage controller 150 may transform the input image (e.g. facial images) to the usage-controlled image that may not be used to perform a facial recognition while still may be used to perform a face matching. In other words, the output image may be such a transformation of the input image in which face matching characteristics present in the input image are preserved and facial recognition characteristics (e.g. unique facial features, biometric identification features) are anonymized. Accordingly, by transforming the input image to the usage-controlled image, the image usage controller 150 may restrict usage of the facial image in accordance with a usage policy for which the user has provided a consent. Further details related to the image usage controller 150 are described in reference to FIGS. 2-9, hereinafter.

By way of implementation of various example embodiments described herein, the system 100 may protect data privacy interests of individuals while sharing personal data (e.g. photographs, facial images) with third-parties. Various example embodiments described herein may also be implemented on an electronic device such as, a smartphone such that a camera of the smartphone may be configured to modify the images captured by the camera, thereby, controlling an unwanted or malicious use of the personal images.

Figure 2:
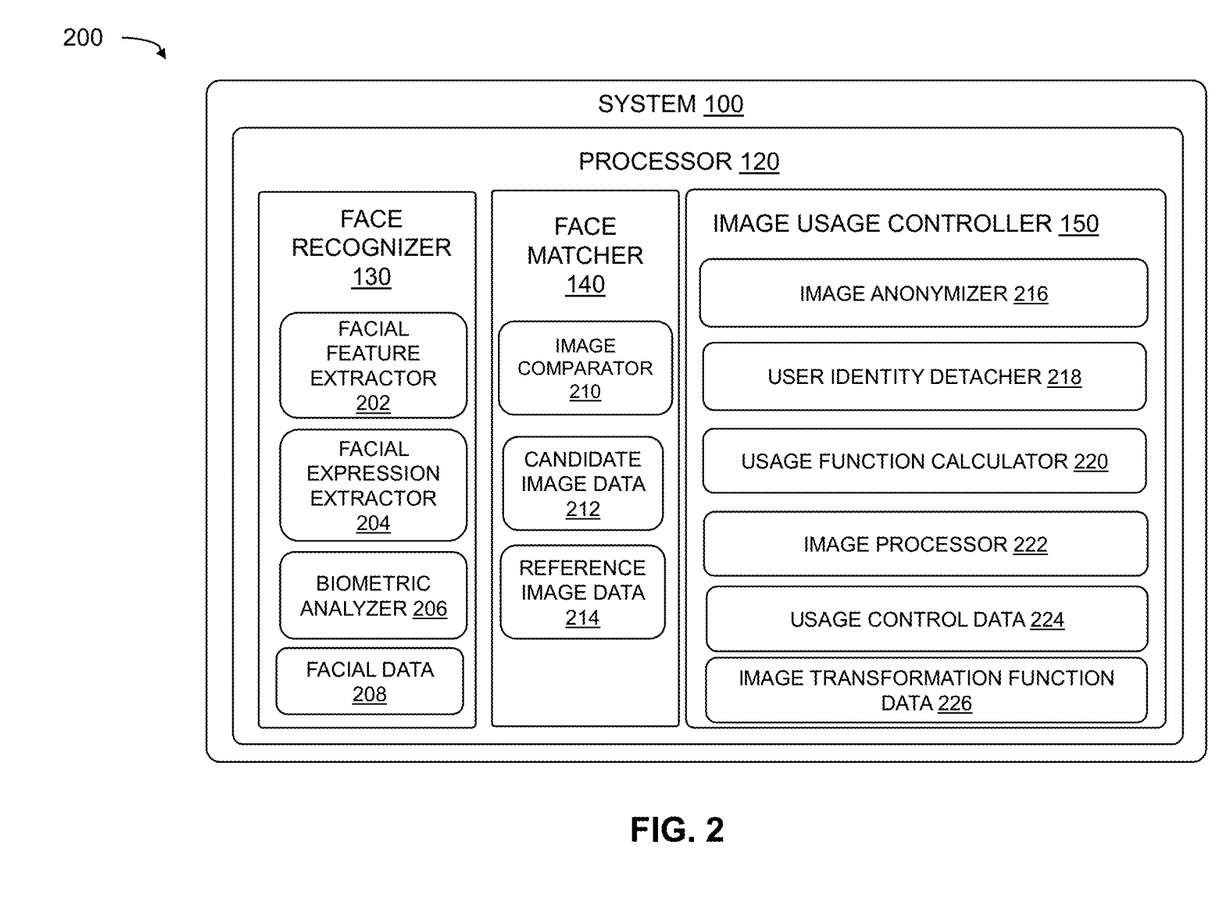
FIG. 2 illustrates various components of the system for controlling usage of the personal data, according to an example embodiment of the present disclosure.

FIG. 2 illustrates a schematic view 200 of various components of the system 100 for controlling usage of the personal data, according to an example embodiment of the present disclosure. Illustratively, the system 100 includes the processor 120, the face recognizer 130, the face matcher 140, and the image usage controller 150.

In accordance with various example embodiments described herein, the face recognizer 130 may include a facial feature extractor 202. The facial feature extractor 202 may be capable of processing an input image to extract various facial features (i.e. features related to a face of the individual) from the input image. For instance, the facial feature extractor 202 may extract facial features (e.g., but not limited to, distance between eyes, shape of nose, shape of lips, structure of face etc.) associated with face of an individual from the input image. Various techniques may be used by the facial feature extractor 202 to extract the facial features. For instance, in some example embodiments, the facial feature extractor 202 may extract facial features by performing one or more known techniques such as, principal component analysis, partial least squares, isomap, latent semantic analysis, and/or the like. The facial feature extractor 202 may use other known techniques to identify and extract one or more facial features (e.g. features related to eyes, nose, mouth etc.) from the input image.

As illustrated, the face recognizer 130 may include a facial expression extractor 204 that may recognize, and extract patterns associated with the facial features from the input image. For example, the facial expression extractor 204 may identify facial expressions like, but not limited to, a happy face expression, a sad face expression, a surprised face expression, an excited face expression etc. In some example embodiments, the facial expression extractor 204 may use machine learning techniques that may be based on one or more of a Hidden Markov Model (HMM), K-nearest neighbor (KNN) classifier, covariance pooling etc. to identify, and extract data related to the facial expressions from the input image.

Furthermore, as illustrated, the face recognizer 130 may include a biometric analyzer 206 that may extract biometric information associated with facial identity of the individual. The biometric analyzer 206 may use one or more information extracted by the facial feature extractor 202 and/or the facial expression extractor 204 to establish the biometric identity of the individual present in the input image. The biometric analyzer 206 may identify one or more patterns in the facial features and/or the facial expressions to formulate a biometric identity. The biometric identity extracted by the biometric analyzer 206 may include such facial features and expressions that may uniquely identify a face of the individual. In other words, no two persons may have a similar facial biometric identity. The facial information (e.g. facial feature, facial expression, biometric identity etc.) may be stored as facial data 208 by the face recognizer 130. According to the example embodiment, the facial data 208 may be used by the face recognizer 130 to recognize the identity (e.g. facial identity) of the individual from an input image. Further details associated with the face recognizer are described in reference to FIG. 5.

Illustratively, the face matcher 140 of the system 100 may include various components such as, an image comparator 210, candidate image data 212, and reference image data 214. As described earlier, the face matcher 140 may be capable of comparing the candidate picture and the reference picture to identify if same face is present in both the pictures. In an example embodiment, the face matcher 140 may receive the candidate picture from the candidate image data 212 and the reference picture from the reference image data 214 and provide an output that indicates if the two pictures include face of a same person. In an example embodiment, the candidate picture may correspond to the input image and the reference picture may correspond to an output image (i.e. the usage-controlled image) provided by the image usage controller 150. Accordingly, the face matcher 140 may provide a feedback indicating if a first face present in the candidate picture matches with a second face present in the reference picture. Further details related to the face matcher 140 are described in reference to FIG. 4.

Illustratively, the system 100 includes the image usage controller 150. The image usage controller 150 may control the usage of the input image in accordance with a data usage policy. According to various example embodiments described herein, the image usage controller 150 may transform the input image to the usage-controlled image that may not be used (e.g. by a third party) for a purpose which to which the user has not provided his/her consent. As illustrated, the image usage controller 150 may include various components such as, an image anonymizer 216, a user identity detacher 218, a usage function calculator 220, an image processor 222, usage control data 224, and image transformation function data 226 that may be used for transforming the input image to the usage-controlled image.

According to the said example embodiment, the image anonymizer 216 may process the input image to anonymize one or more characteristics (e.g. visually identifiable characteristics) from the input image. In an example, the image anonymizer 216 may anonymize one or more unique facial features from the input image. In an example embodiment, the user identity detacher 218 may utilize unique facial features identified by the image anonymizer 216 and detach such facial features corresponding to an individual's identity from the input image. In some examples, the image anonymizer 216 may deform one or more features by using one or more attack functions (e.g. an exploratory attack function, a causative attack function etc.) details of which are later described. In some example embodiments, the image anonymizer 216 may anonymize visibly identifiable features which may uniquely identify a person from the input image and eventually reduce an accuracy of performing a face recognition.

In accordance with various example embodiments described herein, the image usage controller 150 may transform the input image to the usage controlled image such that, the usage controlled image may be used (e.g. by the face matcher 140) for purposes of verifying face matching characteristics, however, may not be used (e.g. by the face recognizer 130) for purposes of recognizing an identity of an individual from the input image.

Illustratively, the image usage controller 150 includes the usage function calculator 220 that may be capable of calculating a usage control matrix from the input image. There may be one or more candidates corresponding to usage control matrix that may be identified to construct the usage-controlled image. In an example embodiment, the usage function calculator 220 may identify one or more attack functions (e.g. exploratory attack function, causative attack function etc.). The attack functions may be identified according to a type and/or characteristic associated with the input image. Further, the attack functions selected by the usage function calculator 220 may be used for processing the input image by the image processor 222.

According to the example embodiment, based on the selected attack functions, the usage function calculator 220 and the image processor 222, may perform transformation of the input image by applying a collection of the attacks, thereby, generating a plurality of transformed images. Further, the image processor 222 may analyze the plurality of transformed images to identify a set of images that best meets or satisfies a pre-defined criterion. The pre-defined criteria may be at least associated with compliance of data usage based on the data usage policy. In some examples, the data usage policy may be locally stored as the usage-controlled data 224 by the image usage controller 150. Accordingly, a best matching candidate from the set of images can be outputted by the image usage controller 150 as the output image (i.e. the usage-controlled image). Further details associated with transformation of the input image to the usage-controlled image are described in reference to FIGS. 6 and 7.

Figure 3:
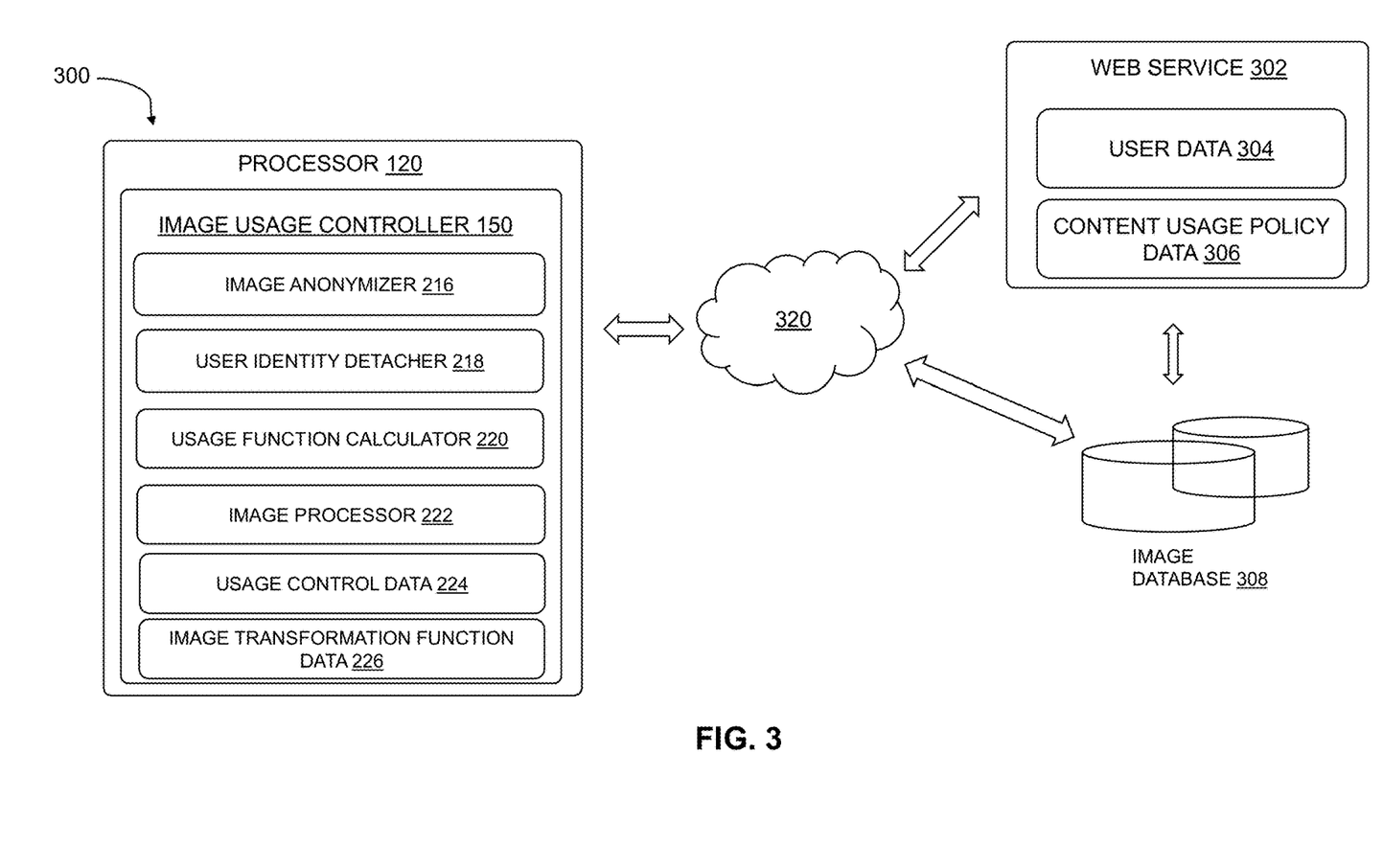
FIG. 3 illustrates another diagram of the system for controlling usage of the personal data according to a data usage policy by a third party, in accordance with an example embodiment of the present disclosure.

FIG. 3 illustrates a schematic view of the system 100 for controlling usage of the personal data according to a data usage policy related to a third party, in accordance with another example embodiment of the present disclosure. As illustrated, in an example embodiment, the system 100 including the image usage controller 150 may be coupled to a web service 302, via a communication network 320. The web service 302 may correspond to a third party application (e.g. a social networking website, an e-commerce website, a gaming platform etc.) which may request for an access to personal data from a user. In an example embodiment, to access to various services offered by the web service 302, the user may be required to provide access to some of the personal data to the web service 302. As may be understood, the user may provide consent for accessing and/or using some of the personal data of the user by the web service 302 in accordance with a data usage policy shared by the web service 302 to the user. Accordingly, the user may share the personal data with the web service 302. As an example, the user may share one or more personal photographs of the user to the web service 302. In another example, the user may enable the web service 302 to access to an image gallery (e.g. a shared drive or storage space) where the user may be storing his or her personal data.

As may be understood, the web service 302 may preserve some of such user data 304 and may use it in accordance with content usage policy data 306 (i.e. data usage policy). Any act of usage of the user data 304 which is not in compliance with regulations defined in the content usage policy data 306 may be considered illegal or inappropriate on part of the web service 302. According to the example embodiment described herein, the image usage controller 150 may facilitate to prevent occurrence of such inappropriate action by the web service 302. In this aspect, the image usage controller 150 may be capable of transforming the user data 304 into a format that makes it technically non-feasible for the web service 302 to use the user data 304 for a purpose which is not approved by the user. In other words, the image usage controller 150 may transform the personal data of the user in the format which technically enforces on the web service 302, an appropriate usage of the personal data which in compliance with the data usage policy. As an example, the image usage controller 150 may receive the personal data (e.g. an input image) and transform the input image to a usage-controlled image. As described earlier, the usage-controlled image may be indicative of such an image which although closely matches with the input image but may not be used for identification purposes (i.e. for recognizing an identity of the user) based on performing facial recognition and comparing facial features with various facial images that may be previously available in an image database 308.

Figure 4:
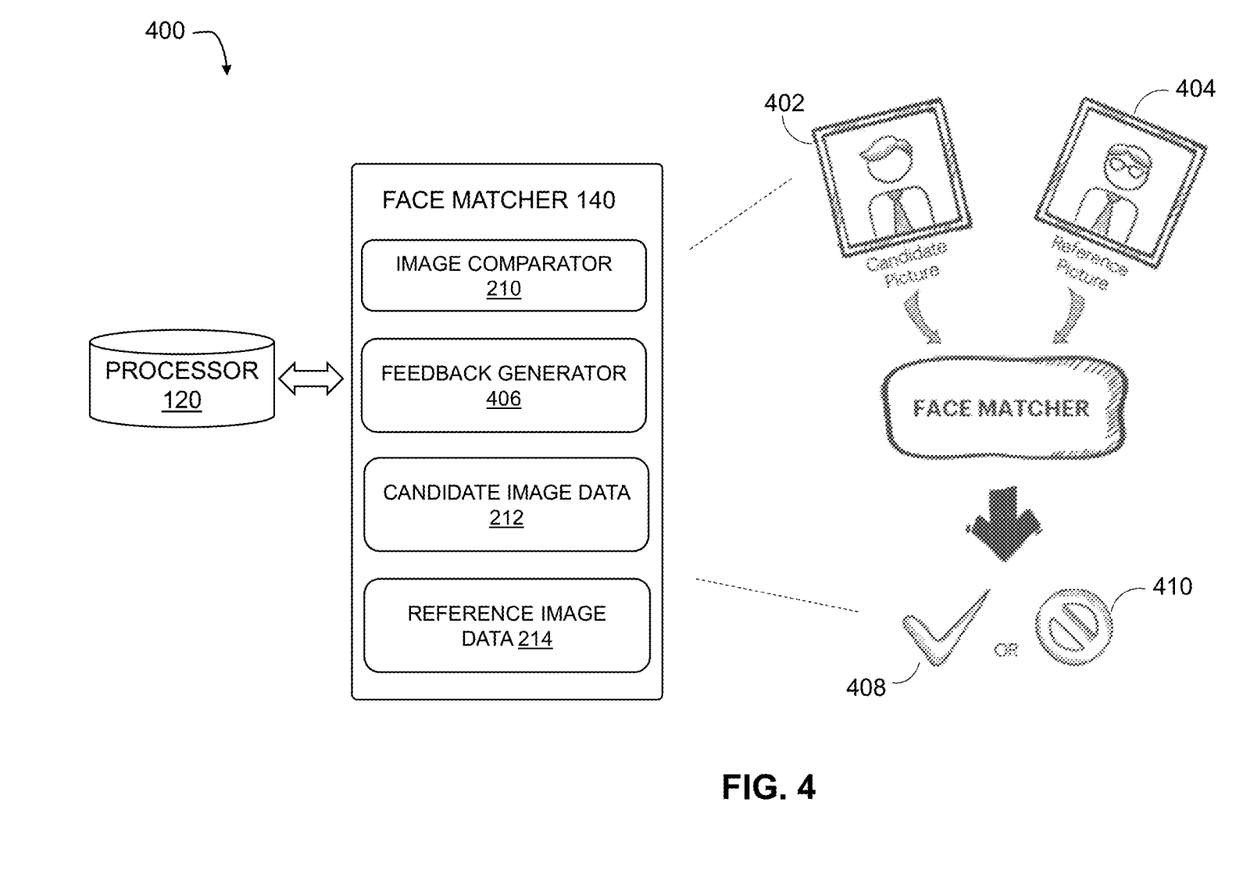
FIG. 4 illustrates an example of a face matcher of the system for controlling usage of the personal data, in accordance with an example embodiment of the present disclosure.

FIG. 4 illustrates an example scenario 400 of the face matcher 140 of the system 100 controlling usage of the personal data, in accordance with an example embodiment of the present disclosure. As illustrated, the face matcher 140 may receive a candidate picture 402 and a reference picture 404. According to some examples, the face matcher 140 may receive the candidate picture 402 from the candidate image data 212 and the reference picture 404 from the reference image data 214. Further, the face matcher 140 may include the image comparator 210 that may compare the candidate picture 402 and the reference picture 404. Furthermore, the face matcher 140 may include a feedback generator 406 that may generate a feedback indicating if, a first face identified from the candidate picture 402 and a second face identified from the reference picture 404, belongs to same person of not. In this aspect, the feedback generator 406 may generate the feedback based on the comparison of the candidate picture 402 and the reference picture 404 performed by the image comparator 210. According to some example embodiments, the feedback generated by the feedback generator 402 may be indicative of 'a matching face' 408 or 'a non-matching face' 410, corresponding to faces (i.e. the first face and the second face) identified from the candidate picture 402 and the reference picture 404. According to some examples, the feedback may be in form of a visual indication e.g. a notification or a pop-up indicating matching of the faces. In some examples, the feedback may be informed of an audible indication e.g. a beep or a short tone indicating matching and/or non-matching of faces in the candidate picture 402 and the reference picture 404.

Figure 5:
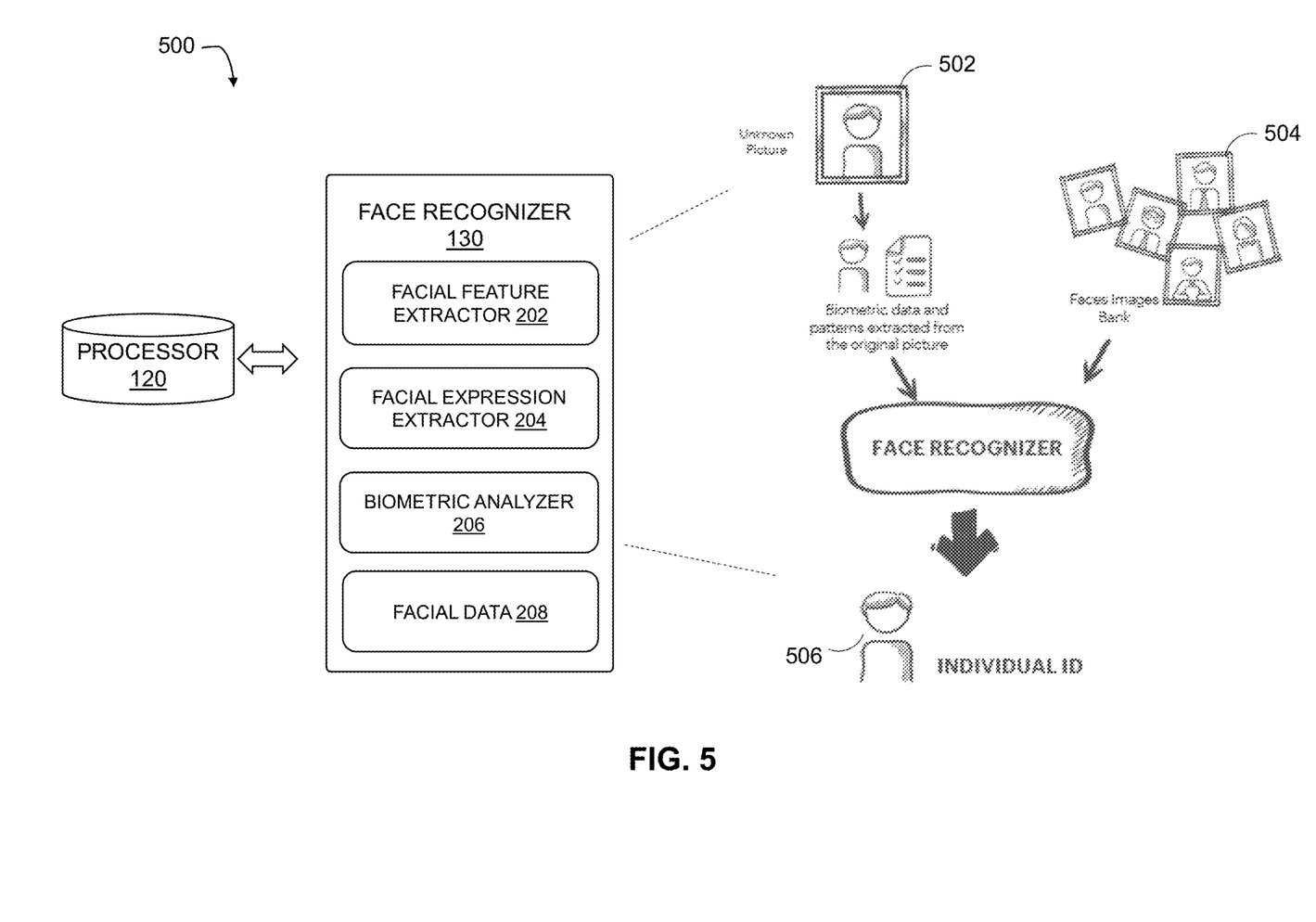
FIG. 5 illustrates an example of a face recognizer of the system for controlling usage of the personal data, in accordance with an example embodiment of the present disclosure.

FIG. 5 illustrates an example scenario 500 depicting the face recognizer 130 of the system 100 for controlling usage of the personal data, in accordance with an example embodiment of the present disclosure. As illustrated, the face recognizer 130 may receive an input picture 502 and identify various characteristics associated with face of an individual that may be present in the input picture 502. For instance, the face recognizer 130 may include the facial feature extractor 202 that may process the input picture 502 to identify and facial features (e.g., but not limited to, distance between eyes, shape of nose, shape of lips, structure of face) associated with face of an individual in the input picture 502. Further, the face recognizer 130 may include the facial expression extractor 204 that may recognize, and extract patterns associated with facial features from the input picture 502. For example, the facial expression extractor 204 may identify facial expressions such as, a happy face expression, sad face expression, surprised face expression, excited face expression and/or the like, from the input picture 502. Furthermore, the face recognizer 130 may include the biometric analyzer 206 that may extract biometric information associated with facial identity of the individual. The biometric analyzer 206 may use one or more information extracted by the facial feature extractor 202 and/or the facial expression extractor 204 to establish the biometric identity of the individual present in the input picture 502. According to some examples, the biometric identity extracted by the biometric analyzer 206 may include such facial features and expressions that may uniquely identify a face of the individual.

According to the example embodiment, the face recognizer 130 may store information (e.g. facial feature, facial expression, biometric identity etc.) extracted by the facial feature extractor 202, the facial expression extractor 204, and/or the biometric analyzer 206, as the facial data 208. Further, the face recognizer 130 may convert this information (i.e. the facial data 208) into a mathematical representation that may be indicative of a facial feature summary of the individual.

As illustrated, the face recognizer 130 may be coupled to an image bank 504 that may be a database having several images, particularly, images of faces of different individuals. According to the example embodiment, the face recognizer 130 may use the facial data 208 stored in the mathematical format and compare it with other mathematical data that may be derived from facial images of the image bank 504 to recognize an individual's identity. In other words, the face recognizer 130 may compare information derived from the images of the image bank 504 with the facial data 208 associated with the input picture 502 to recognize an individual in the input picture 502 and associate it with an individual identity 506.

Figure 6:
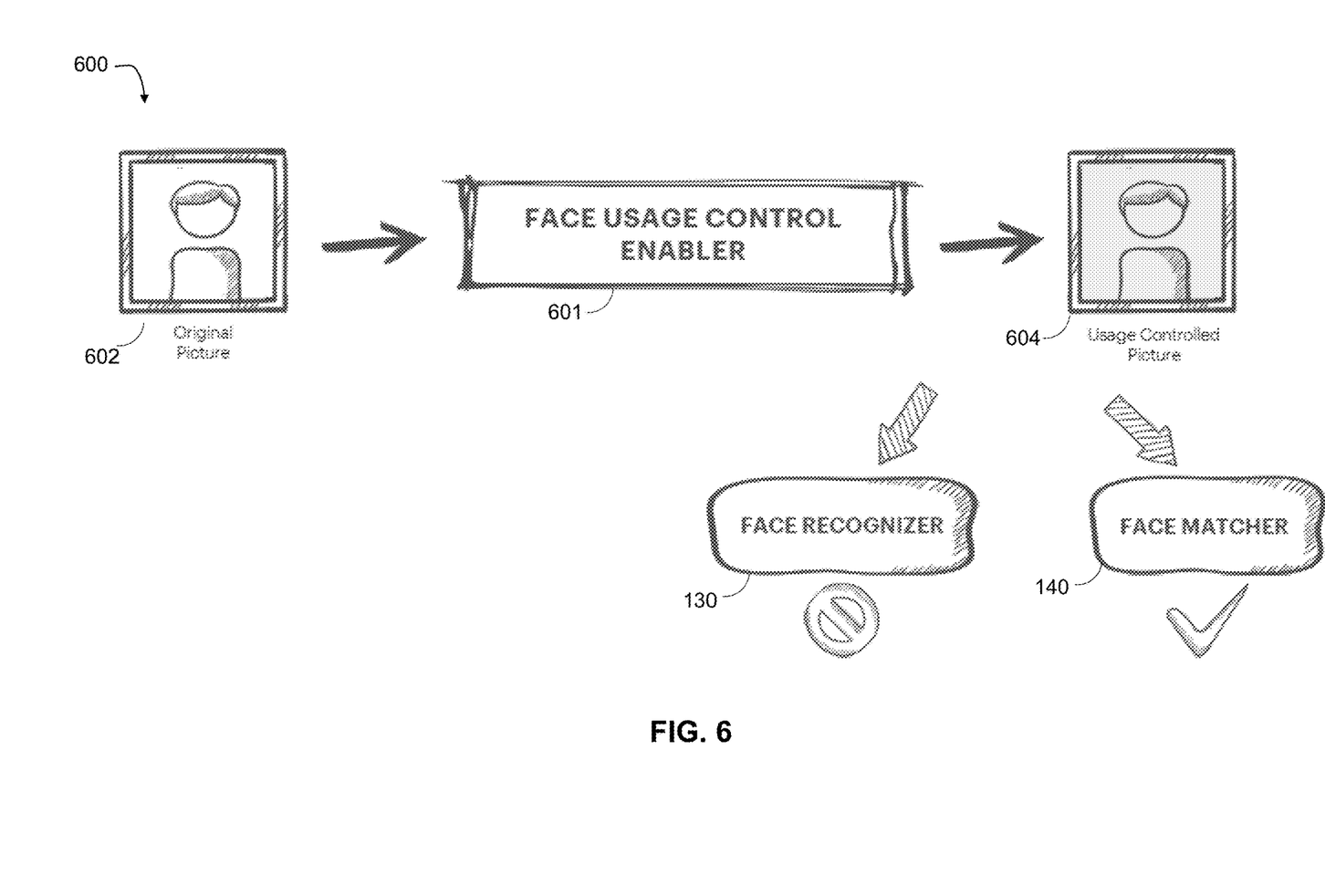
FIG. 6 illustrates an example scenario depicting usage control of image data by a face control usage enabler, in accordance with an example embodiment of the present disclosure.

FIG. 6 illustrates an example scenario 600 depicting usage control of image data by a face control usage enabler 601, in accordance with an example embodiment of the present disclosure. In accordance with an example embodiment, the face control usage enabler may correspond to the image usage controller 150, as described earlier. Illustratively, the image usage controller 150 may receive an input image 602. In an example, the input image 602 may correspond to an image (e.g. an original picture) that may be shared by a user. For instance, in an example, the input image 602 may be a photograph of the user which he or she may have to upload on a social networking platform. Also, in accordance with said example embodiment, the input image 602 may correspond to the personal data for which the user has provided consent for usage according to a data usage policy. The face usage control enabler 601 may control usage of the input image 602 (e.g. by a third party) in accordance with the data usage policy and/or conditions for which the user may have provided his or her consent.

As illustrated, the face usage control enabler 601 may receive the input image 602 and transform the input image 602 to a usage-controlled image 604. The face usage control enabler 601 may perform the transformation using a transformation function (e.g. the usage control function), as described earlier in reference to FIGS. 1-5.

According to the said example embodiment, the transformation of the input image 602 to the usage-controlled image 604 may include performing image anonymization by the image anonymizer 216, as described earlier in reference to FIGS. 1-5. In an example, image anonymization may include anonymizing a face and/or features associated with face of a user, in the input image 602. Further, face anonymization may also include processing the input image 601 such that an identity of the user in the input image 601 may be removed. In other words, an individual's identity and/or features associated with identity of the user, may be detached from the usage-controlled image 604. The usage-controlled image 604 outputted by the face usage control enabler 601 may include characteristics such that, it may not be used further by the face recognizer 130 to recognize and associate an individual's identity.

Further, according to said example embodiment, the face usage control enabler 601 may transform the input image 602 to the usage-controlled image 604 such that, the usage-controlled image 604 may still be used (e.g. by the face matcher 140) to verify if the usage-controlled image 604 is match able to the input image 602. Said differently, the face usage control enabler 601 outputs the usage-controlled image 604 which may not be associated with an individual's identity, however, may still be used to verify an identity to match the individual present in both the images (i.e. the input image 602 and the usage-controlled image 604) if required (e.g. in case of an exceptional request to the user). In this aspect, the usage-controlled image 604 may be compared to the input image 602, by the face matcher 140, to establish if faces of individuals present in both the images matches and belong to a same person or not.

Figure 7:
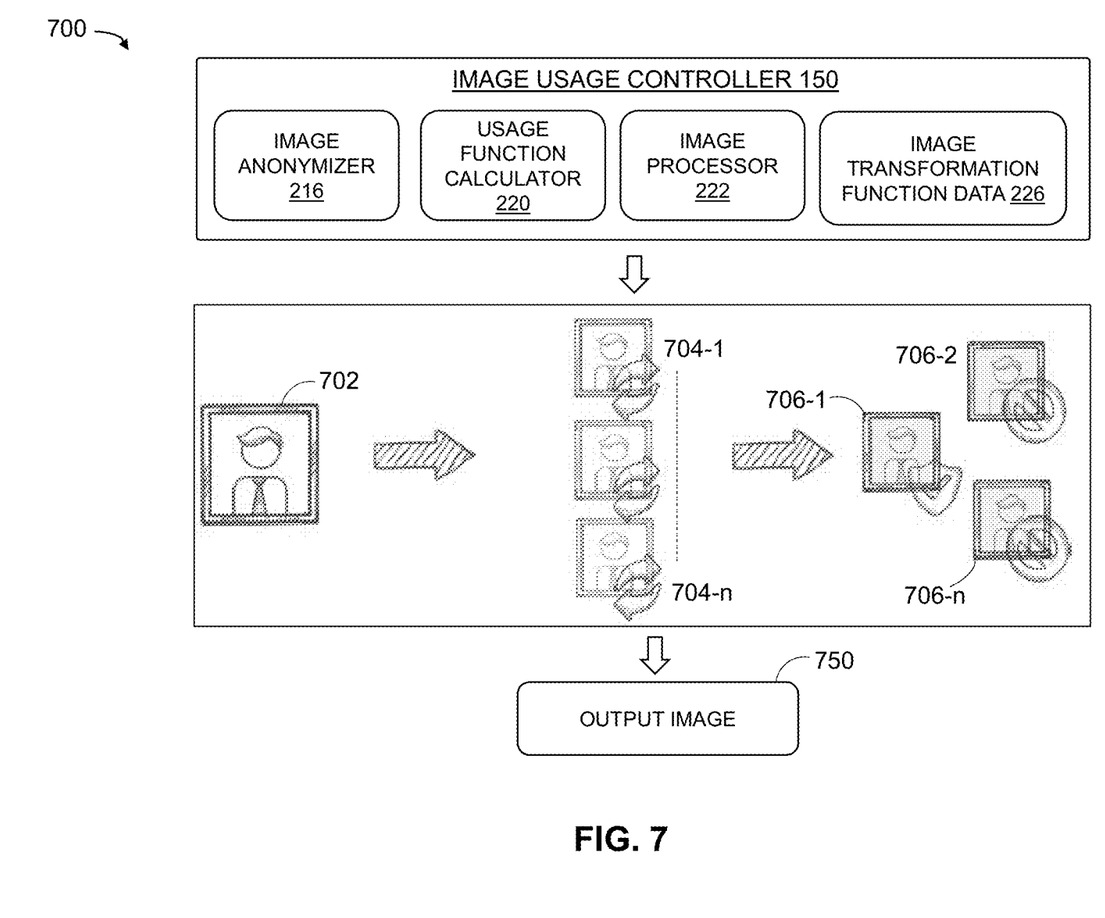
FIG. 7 illustrates an example scenario depicting transformation of an input image by an image usage controller to an output image, in accordance with an example embodiment of the present disclosure.

FIG. 7 illustrates an example scenario 700 depicting transformation of an input image 702 by the image usage controller 150 to an output image 750, in accordance with an example embodiment of the present disclosure. In an example embodiment, the image usage controller 150 may receive an input image 702. The input image 702 may correspond to the image on which a usage control configuration is to be applied by the image usage controller 150. As an example, the input image 702 may be a photograph that is to be uploaded and/or shared by a user to a third party. In an example, the input image 702 may include a face and/or a facial feature of the user.

According to said example embodiment, the image usage controller 150 may include various components such as, the image anonymizer 216, the usage function calculator 220, and/or the image processor 222, that may be used to transform the input image 702 to provide the output image 750. The output image 750 may correspond to a usage-controlled image i.e., an image that may preserve facial characteristics which closely matches to facial characteristics present in original image (e.g. the input image 702). Also, while preserving facial characteristics matching closely to original image, the output image 750 may not be used for facial recognition, by the face recognizer 130, to recognize and associate an identity of individual present in the input image 702.

In accordance with an example embodiment, the usage function calculator 220 may access the input image 702 and compute image transformation function data 226 by calculating a usage control matrix from the input image 702. In this aspect, to find one or more usage control matrix candidates, the usage function calculator 220 may apply a collection of attacks to the input image 702 and generate a plurality of transformed images (704-1, 704-2 ... 704-n) images from the input image 703. In an example embodiment, the usage function calculator 220 may identify an adversarial attack (e.g. an exploratory attack) as a usage control function that may be used to transform the input image 702. The image anonymizer 216 of the image usage controller 150 may deform one or more features identified from the input image 702 to generate the transformed images (704-1, 704-2 ... 704-n). In other words, using the exploratory attack, the image anonymizer 216 may disturb one or more features on the input image 702 so that such disturbances may not be visibly identifiable to a human eye or a machine. In another example, the usage function calculator 220 may identify a causative attack as a usage control function that may be used to transform the input image 702. Using the causative attack may include adding malicious data/information to visual features identified from the input image 702 that may eventually reduce an accuracy of performing a face recognition using the output image 750.

Further, the image processor 222 of the image usage controller may analyze the plurality of transformed images (704-1, 704-2 ... 704-n) using data associated with content usage policy (e.g. regulations or pre-defined rules) to output a plurality of processed images (706-1, 706-2 ... 706-n). The plurality of processed images (706-1, 706-2 ... 706-n) may include images that 'may' or 'may-not' satisfy a pre-defined rule or criteria. The pre-defined rule may be associated with compliance of usage of the input image 702 in accordance with a data usage policy. Further, the image processor 222 may identify, from amongst the plurality of processed images (706-1, 706-2 ... 706-n), a set of images that satisfy the pre-defined rule. Also, in accordance with said example embodiment, the image usage controller 150 may record and store all combinations of visual features associated with the plurality of transformed images (704-1, 704-2 ... 704-n) and the plurality of processed images (706-1, 706-2 ... 706-n), as the image transformation function data 226. The image transformation function data 226 preserved by the image usage controller 150 may be used a later stage with another image candidate to compute a usage control matrix on another image candidate.

According to the said example embodiment, the image processor 222 may identify the set of images from the plurality of processed images (706-1, 706-2 ... 706-n) that meets the pe-defined criteria. Below is an example of equation that may be used by the image usage controller 150 to transform the input image 702 using a usage control function:

$$p'=f(p)=p+uc$$

In above equation, p' represents a transformed image obtained after applying a transformation function f on an original image p. The original image p can correspond to the input image 702 and may be represented as a bitmap (matrix). Further, 'uc' represents the usage control matrix that may be computed by the image usage controller 150 by using the usage control function on the input image 702.

According to said example embodiment the usage control matrix may be computed by the image usage controller 150 based on ensuring following conditions: (a) any allowed usage functions $au^i$ are preserved, (b) applying any allowed usage functions to image p' (i.e. the transformed image) would provide a similar result below a maximal distance (i.e. an allowed threshold at$^i$), than if applied to the image p (i.e. the input image 702), (c) non-allowed usage functions nau$^n$ are preserved, and (d) applying any allowed usage function to the image p' would give a non-similar result, above a minimal distance (i.e. a non-allowed threshold nat$^n$) that if applied to the image p (i.e. the input image 702). These conditions may be represented below in form of following equations:

$$\|au^i(p')-au^i(p)\|<at^i \forall i,n$$

$$|nau^n(P')-nau^n(P)\|>nat^n \forall i,n$$

Accordingly, based on the equations above, the usage control matrix can be computed by the image usage controller 150. According to an example embodiment, parameters at$^i$ and nat$^n$ may be selected by the image usage controller 150 according to the predefined criteria associated with the data usage policy. Following are two examples of usage control applied by the image usage controller 150, in accordance with some example embodiments described herein:

Example 1

Face Match (au$_1$) Distance should be <5% (at$_1$), i.e. if Face Match (p, id) is giving a probability of match of 75%, for this condition, Face Match (p', id) should be in [70-80] % range.

Example 2

Face Recognition Amongst Samples DB (nau$_1$); Distance should be >50% (nat$_1$); i.e. if Face Recognition (p, id) is giving a probability of match of 75%, for this condition, a Face Recognition (p', id) should be less than 25%.

Further, the image usage controller 150 may identify a best candidate (e.g. processed image 706-1) from amongst the plurality of processed images that meets the pre-defined criteria. In an example, the image usage controller 150 may highlight the best candidate identified from the input image 702, as a feedback (e.g. visual notification) to the user.

According to some example embodiments, the best candidate may be identified based on determining a lowest distance indicative of a difference in facial features between the original image (i.e. the input image 702) and the output image 750. According to various example embodiments described herein, the output image 750 provided by the image usage controller 150 may correspond to a picture that may be visually like the input image 702 but may be anonymized for usage purposes for which the user has not provided a consent. In other words, the output image 750 may not be used by the face recognizer 130 to recognize an identity of the user if it is compared to a bank of pre-stored images.

Figure 8:
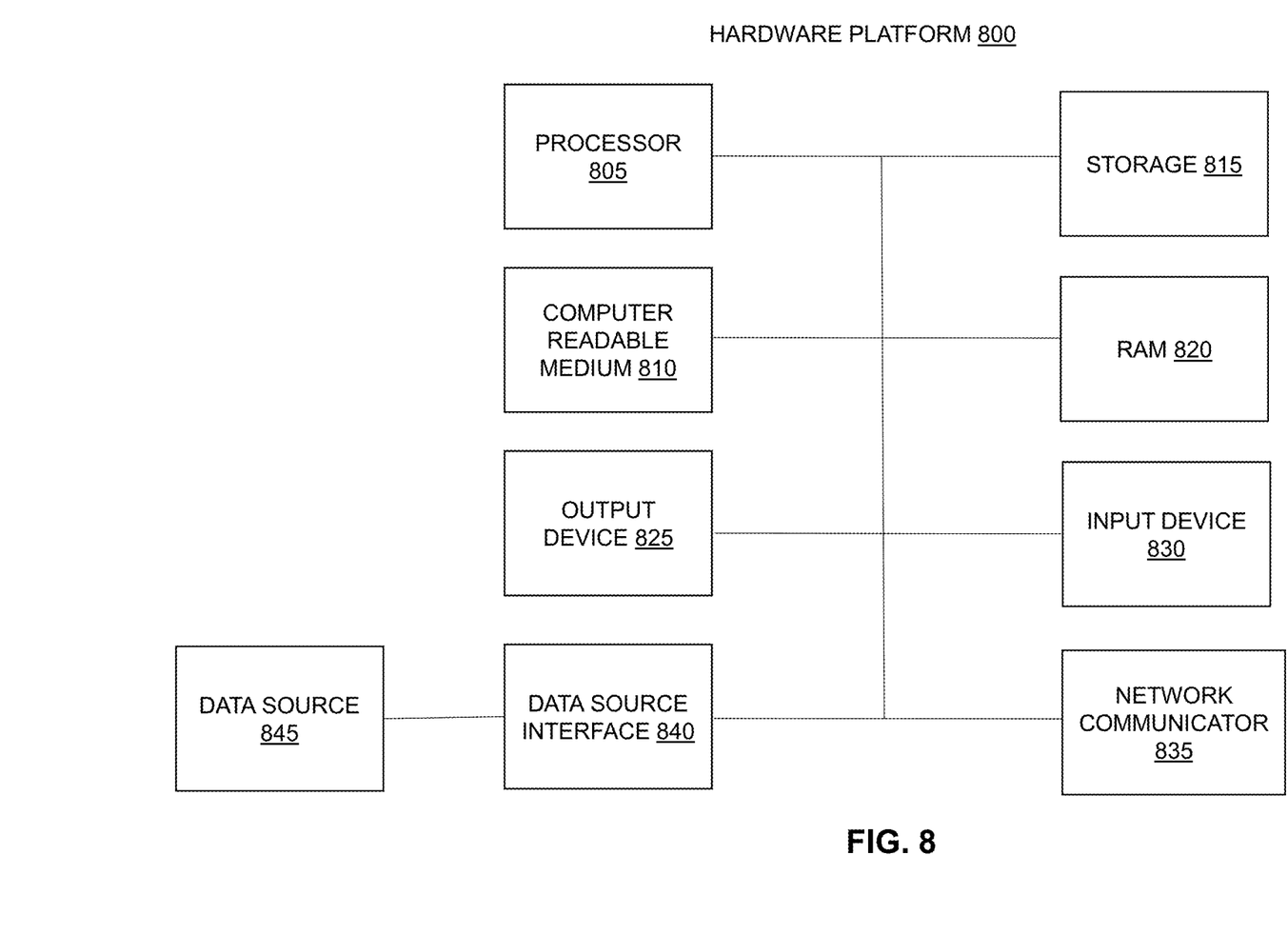
FIG. 8 illustrates a hardware platform for the implementation of the system for controlling usage of the personal data, according to an example embodiment of the present disclosure.

FIG. 8 illustrates a hardware platform 800 for implementation of the system 100, according to an example embodiment of the present disclosure. Particularly, computing machines such as but not limited to internal/external server clusters, quantum computers, desktops, laptops, smartphones, tablets and wearables which may be used to execute the system 100 or may have the structure of the hardware platform 800. The hardware platform 800 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 8, the hardware platform 800 may be a computer system 800 that may be used with the examples described herein. The computer system 800 may represent a computational platform that includes components that may be in a server or another computer system. In an example, the computer system 800 may represent an imaging device that may capture images (e.g. a camera). The imaging device may include various components such as, but not limited to, an image sensor (e.g. a CMOS image sensor), an optical assembly, an optical lens etc. that may be used to capture the images. In some example embodiments, the computer system 800 may correspond to a camera unit of a smartphone. The computer system 800 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 800 may include a processor 805 that executes software instructions or code stored on a non-transitory computer-readable storage medium 810 to perform methods of the present disclosure. The software code includes, for example, instructions to gather data and documents and analyze documents.

The instructions on the computer-readable storage medium 810 are read and stored the instructions in storage 815 or in random access memory (RAM) 820. The storage 815 provides a large space for keeping static data where at least some instructions could be stored for later execution. The stored instructions may be further compiled to generate other representations of the instructions and dynamically stored in the RAM 820. The processor 805 reads instructions from the RAM 820 and performs actions as instructed.

The computer system 800 further includes an output device 815 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 800 further includes input device 1130 to provide a user or another device with mechanisms for entering data and/or otherwise interact with the computer system 800. The input device may include, for example, a keyboard, a keypad, a mouse, or a touchscreen.

A network communicator 835 may be provided to connect the computer system 800 to a network and in turn to other devices connected to the network including other clients, servers, data stores, and interfaces, for instance. A network communicator 835 may include, for example, a network adapter such as a LAN adapter or a wireless adapter. The computer system 800 includes a data source interface 840 to access data source 845. A data source is an information resource. As an example, a database of exceptions and rules may be a data source. Moreover, knowledge repositories and curated data may be other examples of data sources.

Figure 9:
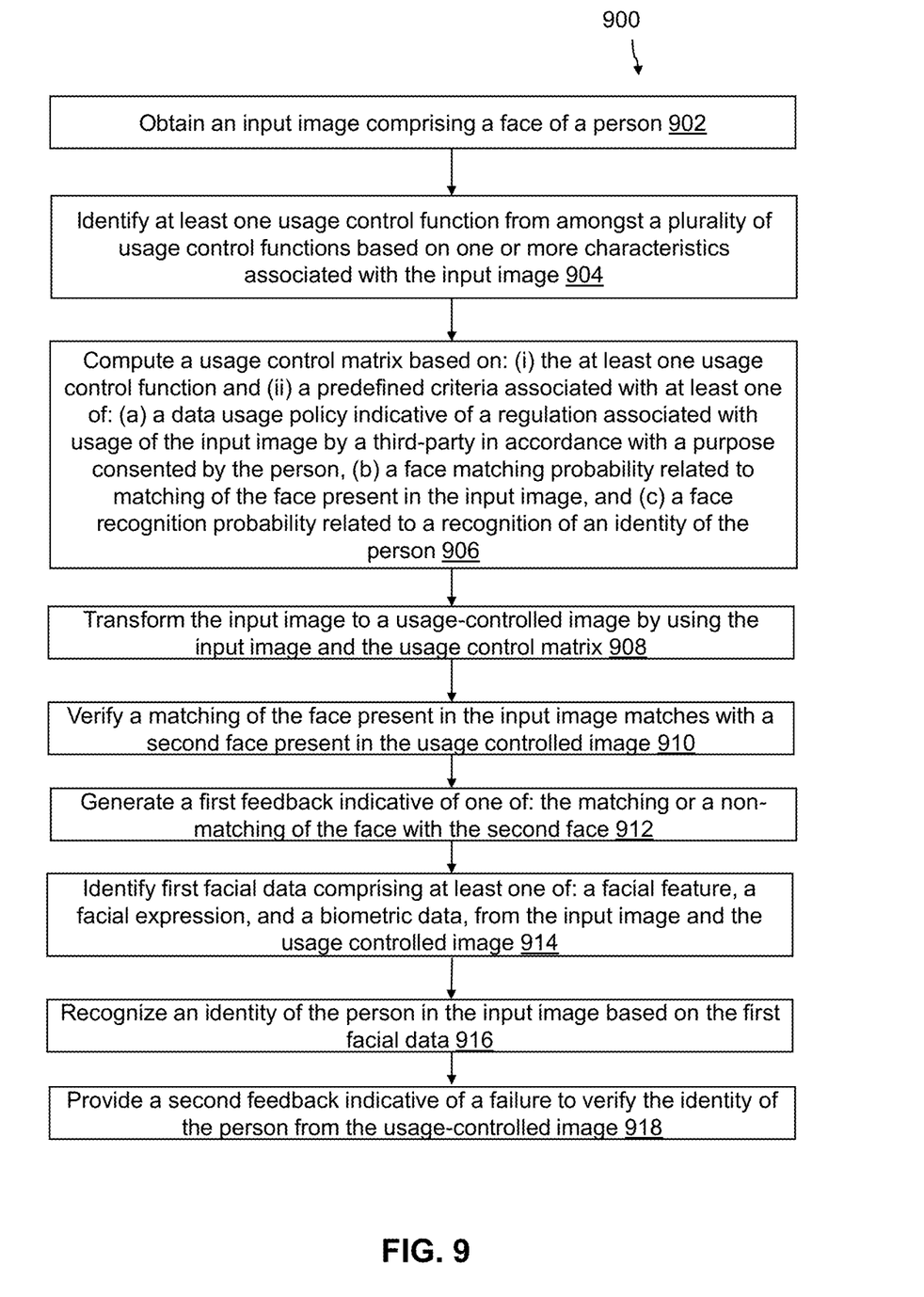
FIG. 9 illustrates a flow diagram for a method of transforming an input image to an output image, by an image usage controller, according to an example embodiment of the present disclosure.

FIG. 9 illustrates a flow diagram for a method 900 of transforming an input image to an output image, by an image usage controller, according to an example embodiment of the present disclosure.

It should be understood that method steps are shown here for reference only and other combinations of the steps may be possible. Further, the method 900 may contain some steps in addition to the steps shown in FIG. 9. According to an example embodiment, the method 900 may be performed by one or more components of the system 100, such as the processor 120, face recognizer 130, the face matcher 140, and the image usage controller 150.

At block 902, an input image may be obtained. The input image may be obtained from a user. In another example, the input image may be obtained from an electronic device. The input image may include a face of a person. As an example, the input image may be a photograph of a user.

At block 904, at least one usage control function may be identified from amongst a plurality of usage control functions. The at least one usage control may be identified based on one or more characteristics associated with the input image.

At block 906, a usage control matrix may be computed. The usage control matrix may be computed based on: (i) the at least one usage control function and (ii) a predefined criteria. The pre-defined criteria may be associated with at least one of: (a) a data usage policy indicative of a regulation associated with usage of the input image by a third party in accordance with a purpose consented by the person, (b) a face matching probability related to matching of the face present in the input image, and (c) a face recognition probability related to a recognition of an identity of the person.

At block 908, the input image may be transformed to a usage-controlled image. The transformation of the input image to the usage-controlled image may be performed based on using the input image and the usage control matrix.

At block 910 a matching of the face present in the input image with a second face present in the usage-controlled image may be verified.

At block 912, a first feedback indicative of one of: the matching or a non-matching of the face with the second face may be generated.

At block 914, first facial data may be identified. The first facial data may include at least one of: a facial feature, a facial expression, and a biometric data, from the input image and the usage-controlled image.

At block 916, an identity of the person in the input image may be recognized based on the first facial data.

At block 918, a second feedback indicative of a failure to verify the identity of the person from the usage-controlled image may be provided.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
    a processor;
    an image usage controller coupled to the processor, the image usage controller to:
        obtain an input image comprising a first face of a person;
        identify, from amongst a plurality of usage control functions, a usage control function based on a characteristic associated with the input image;
        compute a usage control matrix based on the usage control function and a predefined criteria associated with at least one of a data usage policy indicative of a regulation associated with usage of the input image by a third party in accordance with a purpose consented by the person, a face matching probability related to matching of the first face present in the input image, and a face recognition probability related to a recognition of an identity of the person; and
        transform the input image to a usage-controlled image by using the input image and the usage control matrix;
    a face matcher coupled to the processor, the face matcher to:
        verify whether the first face present in the input image matches with a second face present in the usage-controlled image; and
        generate a first feedback indicative of one of a matching and a non-matching of the first face with the second face; and
    a face recognizer coupled to the processor, the face recognizer to:
        obtain the input image and the usage-controlled image;
        identify first facial data comprising at least one of a facial feature, a facial expression, and a biometric data, from the input image and the usage-controlled image;
        recognize an identity of the person in the input image based on the first facial data; and
        provide a second feedback indicative of a failure to verify the identity of the person from the usage-controlled image.

2. The system of claim 1, wherein the face recognizer further comprises:
    a facial feature extractor coupled to the processor, the facial feature extractor to extract the facial feature from the input image, wherein the facial feature is associated with at least one of a nose, an eye, a jaw line, a portion of lip, an eyebrow, an ear, a forehead, of the person in the input image;
    a facial expression extractor coupled to the processor, the facial feature extractor to:
        obtain, from the facial feature extractor, the facial feature identified from the input image;
        identify at least one pattern associated with the facial feature; and
        determine a facial expression based on the at least one pattern identified from the facial feature, wherein the facial expression is indicative of an expression of the face of the person in the input image; and
    a biometric analyzer coupled to the processor, the biometric analyzer to:
        derive a mathematical expression using at least one of the facial feature and the facial expression;
        obtain second facial data associated with a plurality of facial reference images from a face image bank; and
        determine a biometric data based on analysis of the mathematical expression and the second facial data, wherein the biometric data uniquely identifies the person in the input image from amongst a plurality of individuals.

3. The system of claim 1, wherein the face recognizer is to further, verify using the usage-controlled image and the input image, the identity of the person, in response to receiving a user input indicative of a consent by a user.

4. The system of claim 2, wherein the facial feature comprises at least one of a distance between eyes on a face, a structure of a face, a shape of the lip, a length of the eyebrow, a size of the nose, a shape of the ears, and a structure of the jaw line.

5. The system of claim 2, wherein the facial expression comprises at least one of a happy face expression, a sad face expression, a surprised face expression, and an angry face expression.

6. The system of claim 1, wherein the face matcher further comprises an image comparator coupled to the processor, the image comparator to:
   compare a first facial information associated with the first face present in the input image with a second facial information associated with the second face present in the usage-controlled image; and
   generate a feedback indicative of one of: a matching or a non-matching of the first face in the input image with the second face in the usage-controlled image.

7. The system of claim 1, wherein the image usage controller comprises:
   an image anonymizer coupled to the processor, the image anonymizer to anonymize at least one visual characteristic in the input image according to the pre-defined criteria;
   a user identity detacher coupled to the processor, the user identity detacher to detach the identity of person in the input image based on an input by the facial recognizer; and
   a usage function calculator coupled to the processor, the usage function calculator to select the usage control function from amongst the plurality of usage control functions; and
   an image processor coupled to the processor, the image processor to transform the input image to the usage-controlled image based on the input image, the usage control function, and the usage control matrix.

8. A method comprising:
   obtaining, by a processor, an input image comprising a face of a person;
   identifying, by the processor, a usage control function from amongst a plurality of usage control functions based on a characteristic associated with the input image;
   computing, by the processor, a usage control matrix based on: (i) the usage control function and (ii) a predefined criteria associated with at least one of: (a) a data usage policy indicative of a regulation associated with usage of the input image by a third party in accordance with a purpose consented by the person, (b) a face matching probability related to matching of the face present in the input image, and (c) a face recognition probability related to a recognition of an identity of the person;
   transforming, by the processor, the input image to a usage-controlled image by using the input image and the usage control matrix;
   verifying, by the processor, a matching of the face present in the input image with a second face present in the usage-controlled image;
   generating, by the processor, a first feedback indicative of one of: the matching or a non-matching of the face with the second face;
   identifying, by the processor, first facial data comprising at least one of: a facial feature, a facial expression, and a biometric data, from the input image and the usage-controlled image;
   recognizing, by the processor, an identity of the person in the input image based on the first facial data; and
   providing, by the processor, a second feedback indicative of a failure to verify the identity of the person from the usage-controlled image.

9. The method of claim 8 further comprising:
   receiving, by the processor, a user input indicative of a consent by a user to use the input image for an identification purpose; and
   based on the receiving, verifying, by the processor, the identity of the person using the usage-controlled image and the input image.

10. The method of claim 8 further comprising:
   obtaining, by the processor, the facial feature identified from the input image;
   identifying at least one pattern associated with the facial feature;
   determining the facial expression based on the at least one pattern identified from the facial feature, wherein the facial expression is indicative of an expression of the face of the person in the input image;
   deriving, by the processor, a mathematical expression using at least one of the facial feature and the facial expression;
   obtaining, by the processor, second facial data associated with a plurality of facial reference images from a face image bank; and
   determining, by the processor, the biometric data based on analysis of the mathematical expression and the second facial data, wherein the biometric data uniquely identifies the person in the input image from amongst a plurality of individuals.

11. The method of claim 8 comprising:
   anonymizing, by the processor, at least one visual characteristic in the input image according to the pre-defined criteria;
   detaching, by the processor, the identity of person in the input image;
   selecting, by the processor, the usage control function from amongst the plurality of usage control functions; and
   transforming, by the processor, the input image to the usage-controlled image based on the input image, the usage control function, and the usage control matrix.

12. The method of claim 8 wherein, the facial expression comprises at least one of: a happy face expression, a sad face expression, a surprised face expression, and an angry face expression.

13. The method of claim 8 wherein, the facial feature comprises at least one of a distance between eyes on a face, a structure of a face, a shape of the lip, a length of the eyebrow, a size of the nose, a shape of the ears, and a structure of the jaw line.

14. A non-transitory computer readable medium including machine readable instructions that are executable by a processor to:
   obtain an input image comprising a face of a person;
   identify a usage control function from amongst a plurality of usage control functions based on a characteristic associated with the input image;
   compute a usage control matrix based on: (i) the usage control function and (ii) a predefined criteria associated with at least one of: (a) a data usage policy indicative of a regulation associated with usage of the input image by a third party in accordance with a purpose consented by the person, (b) a face matching probability related to matching of the face present in the input image, and (c) a face recognition probability related to a recognition of an identity of the person;

transform the input image to a usage-controlled image by using the input image and the usage control matrix;

verify a matching of the face present in the input image with a second face present in the usage-controlled image;

identify first facial data comprising at least one of: a facial feature, a facial expression, and a biometric data, from the input image and the usage-controlled image;

recognize an identity of the person in the input image based on the first facial data; and provide a first feedback indicative of a failure to verify the identity of the person from the usage-controlled image.

15. The non-transitory computer-readable medium of claim 14, including instructions executable by the processor is to further:

receive a user input indicative of a consent by a user to use the input image for an identification purpose; and based on the receiving, verify the identity of the person using the usage-controlled image and the input image.

16. The non-transitory computer-readable medium of claim 14, including instructions executable by the processor is to further:

obtain the facial feature identified from the input image;

identify at least one pattern associated with the facial feature;

determine the facial expression based on the at least one pattern identified from the facial feature, wherein the facial expression is indicative of an expression of the face of the person in the input image;

derive a mathematical expression using at least one of the facial feature and the facial expression;

obtain second facial data associated with a plurality of facial reference images from a face image bank; and determine the biometric data based on analysis of the mathematical expression and the second facial data, wherein the biometric data uniquely identifies the person in the input image from amongst a plurality of individuals.

17. The non-transitory computer-readable medium of claim 14, wherein the facial feature comprises least one of a distance between eyes on a face, a structure of a face, a shape of the lip, a length of the eyebrow, a size of the nose, a shape of the ears, and a structure of the jaw line.

18. The non-transitory computer-readable medium of claim 14, wherein the processor is to further:

anonymize at least one visual characteristic in the input image according to the pre-defined criteria;

detach the identity of person in the input image;

select the usage control function from amongst the plurality of usage control functions; and transform the input image to the usage-controlled image based on the input image, the usage control function, and the usage control matrix.

19. The non-transitory computer-readable medium of claim 14, wherein the facial expression comprises least one of a happy face expression, a sad face expression, a surprised face expression, and an angry face expression.

20. The non-transitory computer-readable medium of claim 14, wherein the processor is to further: generate a second feedback indicative of one of the matching or a non-matching of the first face with the second face.

* * * * *